2,771,952
Patented Nov. 27, 1956

2,771,952

METHOD OF CONSOLIDATING SUBTERRANEAN FORMATIONS

Clarke N. Simm, Fullerton, Calif., assignor to California Research Corporation, San Francisco, Calif., a corporation of Delaware No Drawing. Application August 24, 1953,
Serial No. 376,262

4 Claims. (Cl. 166—12)

This invention relates in general to a method for consolidating loose and unconsolidated subterranean formations, such as sand, and relates more particularly to a method for consolidating subterranean formations penetrated by a well bore.

In the production of fluid, such as petroleum, from an underground reservoir, it is often desirable to consolidate loose or incompetent formations without rendering them impermeable. Often the petroleum-producing formations penetrated by a bore hole are of such a nature that, when the fluid flows into the bore hole, substantial amounts of the grains or particles of the unconsolidated formations are also carried into the hole. This necessitates the use of some device, such as a liner, gravel pack or a tubular concrete screen, to prevent undesired production of the particles with the production fluid. However, these devices have the disadvantage of becoming plugged with particles after a period of use and requiring cleaning to maintain the porosity thereof.

An additional solution to the problem of consolidating incompetent formations proposed the use of a thermosetting resin injected into the unconsolidated formation to act as a binding agent therefor. However, this method has the disadvantage that, to obtain a substantial binding of the unconsolidated formation, a considerable quantity of resin must be utilized with a consequent undesired reduction in the permeability of the formation.

It has also been proposed to consolidate incompetent formations by exposing them to a temperature high enough to melt and fuse all of the formation constituents. However, this method has the disadvantage that most components of natural subterranean formations fuse at such high temperatures that this method requires temperatures which are considerably in excess of those which can reasonably be obtained.. This method has the further disadvantage that, owing to the fact that it is extremely difficult to obtain a uniformly high temperature throughout the formation being thus treated, the resulting condition of the treated formation varies from complete fusion and devitrification to an unconsolidated state, depending upon the temperature to which the particular portion of the formation was exposed.

Broadly, the present invention contemplates exposing the face of the incompetent formation to an elevated temperature in the presence of a glazing substance to bond the formation particles. By the use of such a glazing substance, a much lower temperature may be used to produce consolidation than is required for fusion without a glazing substance, and a more uniform consolidation results therefrom.

It is therefore an object of the present invention to provide an improved method for consolidating incompetent formations.

It is a further object of the present invention to provide a method for consolidating incompetent formations in which the formation is exposed to an elevated temperature in the presence of a glazing substance to bond the formation particles.

It is an additional object of this invention to provide a method for consolidating incompetent formations in which combustion is initiated and maintained adjacent to the formation in the presence of a glazing substance to bond the formation particles.

The present invention may be described briefly as embodying the steps of exposing the formation to be consolidated to an elevated temperature in the presence of a glazing substance to bond the formation particles.

Any suitable known glazing substance may be utilized in this invention to bond the formation particles together in the presence of an elevated temperature. Lead oxide glazes, such as are commonly used in the ceramics industry, are very suitable. Also, common salt, such as is used in glazing sewer pipe and similar articles, may be utilized satisfactorily. Preferably, a glazing substance which matures at a low temperature is utilized because more uniform maturing of the glazing substance can be assured without requiring excessive temperatures in the well bore. A typical glazing substance contains 1 molecular equivalent PbO and 0.1 molecular equivalent $Al_2O_3$, and matures at 650° C. The concentration of the glazing substance in the sand may range up to 40% by weight, but preferably the concentration is between 15% and 35% by weight to insure a minimum reduction in the porosity of the formation being consolidated. Also, suitable additives which are well known in the glazing art may be added to the glazing substance. For example, alkalines such as calcium and potassium, and intermediates such as boron, may be added to the glazing substance to vary the coefficient of thermal expansion, the elasticity and the mechanical strength of the fired glazing substance to thus vary the range of temperature which the glazing substance can undergo without devitrification.

In one embodiment of practicing the invention, a portion of the well bore adjacent to the incompetent formation is underreamed or undercut for a predetermined distance beyond the well bore diameter and the drilling fluid in the well bore is replaced by crude oil or other available liquid. Then a "pill" or slug of a mixture of sand, glazing compound and oil or other suitable fuel is positioned in the underreamed portion of the well bore adjacent the formation to be consolidated. This pill or slug of the glazing mixture fills the well bore through the length of formation to be consolidated so that the glazing substance in the slug is in contact with the particles of the treated formation. Combustion is then started in this mixture of sand, fuel and glazing substance in the presence of air or oxygen, and the oil or other fuel within the mixture is burned. Air or other combustion gas is supplied at a rate of injection sufficient to cause the zone of combustion to pass out into the formation to be consolidated.. The glazing substance is thus fired by the heat of combustion of the burning mixture to bond together the particles or grains of sand in the glazing mixture in the well bore and to bond these particles or grains to the surrounding formation without a substantial reduction in permeability of the formation.

Thus, a solid plug of consolidated sand is formed in the well bore and this solid plug is firmly bonded to the surrounding formation. The portion of this solid plug corresponding to the well bore diameter may then be drilled out, leaving a thickness of consolidated sand corresponding to the underreamed portion firmly bonded to the formation. I have found that the plugs thus formed are sufficiently consolidated so that they may be drilled using standard drilling techniques without causing crumbling of the plug adjacent to the drilling.

As an alternate to forming a solid plug of consolidated sand as described above, a pilot hole or opening may be provided in the portion of the mixture filling the well bore thereby utilizing a length of conduit which extends into the mixture to inject the combustion gas. The interior of the conduit is thus free of the glazing mixture, so that upon completion of the combustion and consolidation, the opening in the consolidated sand provided by the conduit may be utilized as a continuation of the well bore or a pilot hole for subsequent drilling.

The formation particles may be bonded together either by sintering or by fusing, depending upon the temperature obtained. In sintering, only the outer surface of the particles reaches the melting point so that adjacent particles are bonded together only at their points of contact, whereas in fusing, all, or substantially all, of each of the particles becomes fluid so that the particles tend to flow together and, upon cooling, form separated groups of solid material. The resulting effective permeabilities of the sintered and fused formations are approximately the same, but the flowing together into separate groups of the particles of the fused formations produces a less uniform permeability throughout the treated formation, so that sintering is preferred to fusing in most cases.

The following table sets forth the results of tests on varying proportions of sand and a lead oxide glazing substance. The glazing substance used in these tests was 1 molecular equivalent PbO and 0.1 molecular equivalent $Al_2O_3$, maturing at 650° C., and the sand was a common mined variety of 20 to 100 mesh. The indicated amounts of the glazing substance and sand were mixed and the mixtures were heated for two hours at 1500° F. The remarks describe the condition of the mixtures after the heating.

| Parts by Weight | | Remarks |
| --- | --- | --- |
| Sand | Glazing Substance | |
| 0.5 | 1.0 | Highly impermeable—undesirable for production formation. |
| 1.0 | 1.0 | Impermeable—not too desirable for production formation. |
| 3.0 | 1.0 | Highly permeable with good bonding of sand grains—very desirable for production formations. |
| 4.0 | 1.0 | Highly permeable with good bonding of sand grains—very desirable for production formations. |
| 7.0 | 1.0 | Highly permeable with loose bond between sand grains. |
| 10.0 | 1.0 | Highly permeable with poor bond between sand grains. |

In an additional laboratory test, another lead oxide glazing substance which matured at 1100° C. was utilized. This latter substance had added thereto compounds containing calcium, potassium, and boron to vary the thermal and mechanical properties of the compound. Mixtures of this substance and sand were baked for 2 hours at 1100° C., and the results were substantially the same as those set forth in the above table for the 650° C. glazing substance.

In an additional method of practicing the present invention, a slurry of the glazing substance in an oil or water carrier is introduced into the well bore adjacent to the formation. Pressure is then applied to this slurry to impregnate the portion of the formation surrounding the well bore. Then combustion may be initiated and maintained, as above, to fire the glazing substance in place and thereby consolidate the formation. This method is particularly useful in consolidating a formation surrounding a slotted liner without removing the liner.

Although but a few illustrative embodiments of the present invention have been described, it will be apparent to those skilled in the art that various changes and modifications may be made therein without departing from the spirit of the invention or the scope of the appended claims.

I claim:

1. A method for consolidating the particles of an incompetent sand formation encountered in a well bore comprising the steps of introducing into said well bore adjacent said formation a mixture comprising a glazing substance and a combustible fuel, initiating combustion in said fuel in said mixture, and supplying a combustion gas to said mixture to maintain said combustion at a sufficiently elevated temperature to fire said glazing substance, whereby said glazing substance is fired to bond together said particles.

2. A method for consolidating in situ the particles of an incompetent sand formation encountered in a well bore comprising the steps of introducing into said well bore a mixture of a combustible fuel and a lead oxide glazing substance containing boron, calcium and potassium, applying pressure to force said mixture into said formation, initiating combustion in said fuel, and maintaining said combustion at a sufficiently elevated temperature to fire said glazing substance and bond together said particles.

3. A method for consolidating in situ the particles of an incompetent subterranean sand formation penetrated by a well bore comprising the steps of underreaming a portion of said well bore adjacent said formation, introducing into said well bore in said underreamed portion a mixture comprising sand, a glazing substance and a combustible fuel, initiating combustion in said fuel in said mixture, and maintaining said combustion in said fuel at a sufficiently elevated temperature to fire said glazing substance and thereby bond together said sand and to bond said sand to said particles.

4. A method for consolidating in situ the particles of an incompetent subterranean sand formation penetrated by a well bore comprising the steps of underreaming a portion of said well bore adjacent said formation, introducing into said well bore in said underreamed portion a mixture comprising sand, a lead oxide glazing substance and a combustible fuel, the concentration of said lead oxide glazing substance in said sand ranging from 10 to 40 percent by weight, initiating combustion in said fuel in said mixture, and maintaining said combustion in said fuel at a sufficiently elevated temperature to fire said glazing substance and thereby bond together said sand and to bond said sand to said particles.

References Cited in the file of this patent

UNITED STATES PATENTS

| | | |
| --- | --- | --- |
| 1,075,932 | Osborn et al. | Oct. 14, 1913 |
| 1,117,601 | Porter | Nov. 17, 1914 |
| 1,610,182 | Thomson | Dec. 7, 1926 |
| 2,110,236 | Nolan | Mar. 8, 1938 |
| 2,288,557 | Vollmer | June 2, 1942 |
| 2,388,866 | Partridge | Nov. 13, 1945 |
| 2,674,323 | Cardwell | Apr. 6, 1954 |